US009749870B2

(12) United States Patent
Kadel et al.

(10) Patent No.: US 9,749,870 B2
(45) Date of Patent: Aug. 29, 2017

(54) CONTEXTUAL AND PREDICTIVE PRIORITIZATION OF SPECTRUM ACCESS

(71) Applicant: Deutsche Telekom AG, Bonn (DE)

(72) Inventors: Gerhard Kadel, Darmstadt (DE); Julian Charles Nolan, Pully (CH)

(73) Assignee: DEUSTSCHE TELEKOM AG, Bonn (DE)

( * ) Notice: Subject to any disclaimer, the term of this patent is extended or adjusted under 35 U.S.C. 154(b) by 711 days.

(21) Appl. No.: 14/178,372

(22) Filed: Feb. 12, 2014

(65) Prior Publication Data

US 2014/0233472 A1 Aug. 21, 2014

(30) Foreign Application Priority Data

Feb. 21, 2013 (EP) ..................................... 13156195

(51) Int. Cl.
| | | |
|---|---|---|
| *H04W 16/14* | (2009.01) | |
| *H04W 24/02* | (2009.01) | |
| *H04W 4/02* | (2009.01) | |
| *H04W 28/26* | (2009.01) | |
| *H04W 72/10* | (2009.01) | |

(52) U.S. Cl.
CPC ............ *H04W 16/14* (2013.01); *H04W 4/028* (2013.01); *H04W 24/02* (2013.01); *H04W 28/26* (2013.01); *H04W 72/10* (2013.01)

(58) Field of Classification Search
CPC ..... H04W 16/14; H04W 4/028; H04W 24/02; H04W 28/26; H04W 72/10
See application file for complete search history.

(56) References Cited

U.S. PATENT DOCUMENTS

| | | | |
|---|---|---|---|
| 6,125,278 A | 9/2000 | Wieczorek | |
| 2009/0247204 A1* | 10/2009 | Sennett | H04W 16/14 455/512 |
| 2010/0178928 A1 | 7/2010 | O'Reilly | |
| 2011/0237200 A1 | 9/2011 | Reunamaki et al. | |
| 2011/0310865 A1* | 12/2011 | Kennedy | H04W 4/028 370/338 |

(Continued)

FOREIGN PATENT DOCUMENTS

| | | |
|---|---|---|
| EP | 2391160 A1 | 11/2011 |
| KR | 20110108308 A | 10/2011 |

(Continued)

*Primary Examiner* — Anez Ebrahim
*Assistant Examiner* — Omeed D Rahgozar
(74) *Attorney, Agent, or Firm* — Leydig, Voit & Mayer, Ltd.

(57) ABSTRACT

A method for optimizing network spectrum utilization of a wireless communications network utilizing a radiofrequency spectrum includes determining, by a processor, spectrum resources at a location by determining the properties of the communication nodes and the utilization of bandwidth by all priority classes of user terminals in a defined area. Future geo-located contextual network needs for users terminals of a plurality of priority classes in the defined area is predicted by the processor based on historical profiles. The use of the radiofrequency spectrum is optimized by the processor based on the priority classes of the user terminals and the future geo-located contextual network needs of the user terminals in the defined area.

16 Claims, 5 Drawing Sheets system method overview (56) References Cited

U.S. PATENT DOCUMENTS

2013/0005374 A1* 1/2013 Uusitalo ............... H04W 28/26
                                              455/509
2013/0286868 A1* 10/2013 Oyman ................ H04W 24/06
                                              370/252
2013/0290493 A1* 10/2013 Oyman ................ H04B 7/0486
                                              709/219

FOREIGN PATENT DOCUMENTS

| | | |
|---|---|---|
| WO | WO 2011100103 A2 | 8/2011 |
| WO | WO 2011119917 A2 | 9/2011 |
| WO | WO 2011156114 A2 | 12/2011 |
| WO | WO 2012003566 A1 | 1/2012 |
| WO | WO 2012068138 A1 | 5/2012 |

* cited by examiner

Figure 1 – overview of possible spectrum sensing method which may be used to determine the location and properties of communication nodes in proximity to a users current location. A time variant map may be established correlating the contextual utilisation and properties of network nodes for multiple locations.

Figure 2 – system method overview

Figure 3 – example system diagram

CONTEXTUAL AND PREDICTIVE PRIORITIZATION OF SPECTRUM ACCESS

CROSS-REFERENCE TO RELATED APPLICATIONS

Priority is claimed to European Patent Application No. EP 13156195.3, filed on Feb. 21, 2013, the entire disclosure of which is hereby incorporated by reference herein.

FIELD

The present disclosure relates to optimizing network spectrum utilization for a wireless communications network with multiple nodes, including base stations and user terminals, that utilizes a radio frequency spectrum.

BACKGROUND

Due to the rapid growth of wireless communications and ever increasing bandwidth demands from users, increasing spectrum resources are required. In the following, the term spectrum resources defines the radio frequency bandwidth in one or more frequency bands within the radio frequency spectrum which is available to be used for a defined radio standard.

Within the conventional spectrum framework, most of the spectrum bands are exclusively allocated to specific license holders for dedicated applications areas (e.g. broadcasting services or mobile communication services). Several license bands are underutilized however (for example, TV broadcasting, military bands), which results in spectrum wastage.

The standard IEEE 802.22 has been formed to develop the air interface specifications for secondary access to television channels where these channels have (local and/or temporal) "white spaces" in their utilization, and indeed spectrum sensing forms one of the key features of most envisaged "cognitive" radio systems. Noise uncertainty, multipath fading and shadowing are some of the fundamental properties of wireless channels which are responsible for limiting the performance of spectrum sensing.

Publications such as WO2011156114 (Microsoft) describe, for example, if a first white space channel is unavailable, due to the presence of the primary user, then a second white space channel should be determined and used. An additional example, WO2011100103 (Microsoft), describes sensing white space information using collaborative sensing principles, and the use of proxy devices between database server and receiving device. A further Microsoft publication, WO2011119917, describes how users of cellular mobile systems may be selected to receive incentives to use a different frequency band, outside of the allocated cellular spectrum, if a base station is overloaded.

The sharing of white space information in communication networks, and using this information to configure a communications device is addressed in KR20110108308 (Nokia) and EP2391160 by the same company describes a time variant collaborative sensing of white space, coordinated by a central node.

WO2012003566 (WILAN) describes using databases to store and recall white space information, whilst WO2012068138 (Qualcomm) describes location specific spectrum sensing.

In detail WO2011119917 (A2), CELLULAR SERVICE WITH IMPROVED SERVICE AVAILABILITY (Microsoft), describes a cellular communication system in which overload of a base station is averted by offering users the option to communicate using a spectrum outside of the spectrum allocated for cellular communication. Incentives are offered to connect to the base station using the alternative spectrum, which may not support communications at the same rate as could be supported using the spectrum allocated to the base station for cellular communications. Users may be selected to receive an offer to receive incentives based on range to the base station, with users closer to the base station being more likely to receive such an offer. The cellular communications system may be a 3G wireless system, and the alternative spectrum may be white space in the digital TV spectrum.

In summary, users selected to receive incentives to use a different frequency spectrum, outside of the allocated cellular spectrum, if the base station is overloaded.

WO2011156114 (A2), TRANSMITTING DATA IN A WIRELESS WHITE SPACE NETWORK, discloses a computer-implemented method for transmitting data over a wireless network using white spaces. A first white space transmission channel is determined for communicating with mobile client devices. Wireless communication takes place with the mobile client devices over the first white space transmission channel. If the first white space transmission channel becomes unavailable to one of the mobile client devices because of the presence of a primary user on the first white space transmission channel, a different white space transmission channel is determined for communicating with the mobile client device that is affected. Thereafter, communication with the affected wireless device takes place on the different white space transmission channel, while unaffected devices continue to communicate on the first white space transmission channel.

In summary, if a first white space channel is unavailable, due to the presence of the PU, then a second white space channel is determined and used.

WO2011100103 (A2)—DISTRIBUTED DATABASE ACCESS FOR SPECTRUM ACCESS (Microsoft) discloses a bootstrapping technique for wirelessly obtaining white space data that may be used to identify an available white space channel for connecting to a service. Portable wireless devices may collaborate to provide white space data to a device requesting such data. A requesting device transmits a request for the white space data using, for example, an unlicensed band. A device receiving the request may transmit a copy of the data to the requesting device. The transmitted copy may be obtained by the receiving device from a local data store or may be provided from a database server to which the receiving device is connected. In the later case the receiving device acts as a proxy between the database server and the requesting device. Once the white space data is received by the requesting device it may be used to select a channel for communication in the white space.

In summary, the collecting of white space information using collaborative sensing principles, also includes a proxy devices between database server and receiving device.

KR20110108308 (A), COLLABORATIVE SPECTRUM SENSING IN RADIO ENVIRONMENT (Nokia), discloses a system for configuring wireless communication in apparatuses based on sensed spectrum information. Apparatuses interacting via a shared information space may exchange configuration information that may, for example, comprise communication transport information. The configuration information may then be utilized in formulating spectrum sensing parameters that are distributed to one or more of the apparatuses via the shared information space. The spectrum sensing parameters may be used by the apparatuses for performing signals sensing operations in their respective environments, the results of which may be shared via the shared information space. The spectrum sensing results may then be utilized to configure and/or manage communications in one or more of the apparatuses.

In summary, the document describes the sharing of white space information in communication networks, and using this information to configure a communications device.

EP2391160 (A1), Method and apparatus to select collaborating users in spectrum sensing (Nokia) discloses that in a first time interval TI a first frequency band FB is pseudorandomly selected from a designated spectrum, and a first analysis result is determined by sensing the first FB during the first TI and then transmitted. In a second TI a second FB is pseudorandomly selected from the designated spectrum, and a second analysis result is determined by sensing the second FB during the second TI and then transmitted. Where multiple devices do this the entire spectrum is sensed, each band by a subset of devices that changes at each TI, and so any unused or underutilized spectrum is searched by the collaborative spectrum sensing, which avoids propagation problems such as fading. Also, a central node can assure various collaborating users report different FBs in different TIs such that the subset of reporting users changes for at least one of the bands in each subsequent reporting TI. Sensing and communication can be performed in different portions of the same network defined transmission time interval.

In summary, a time variant collaborative sensing of white space, coordinated by a central node is performed.

WO2012068138 (A1), GEO-LOCATION AIDED SENSING (Qualcomm), discloses a challenge to develop a technique of accurately and efficiently determining an available communication channel. In accordance with some embodiments disclosed herein, techniques for sensing a primary user of a particular communication channel are performed more efficiently. In some implementations, a geo-location of a communication device is combined with a sensing algorithm in order to more efficiently perform spectrum sensing. In some implementations, a geo-location and an accuracy determination may be used to determine all required sample regions in order to ensure that a primary user is not present in a particular location.

WO2012003566 (A1), TV WHITE SPACE DEVICES USING STRUCTURED DATABASES (WILAN), discloses a two-level database structure for use by unlicensed TVBD devices operating in TV white space comprises a central database and local databases. The central database comprises two sub-database: the central licensed database which maintains information about all licensed TV devices and the central unlicensed database which maintains information about unlicensed wireless devices operating in TV spectrum. The local database is created by each TVBD device or TVBD network when it initiates and it stores information related to all transmitters in the local area, including location, power transmission levels, operating schedule, sensing results, backup channel information. The local databases communicate with central database to query it about licensed usage of TV spectrum and register with central database. The local databases communicate with each other to exchange information about channel usage, sensing results, transmission patterns and other information that will allow the local databases to negotiate coexistence without central coordinator. The locally implemented negotiation prevents the overloading of the central database.

Figure 5:
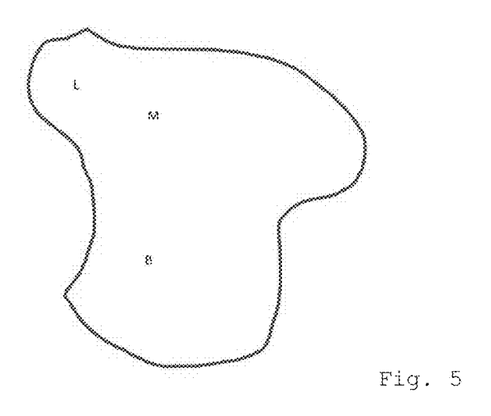
FIG. 5 shows an exemplary geographic distribution of TV transmitters.

Most descriptions of "white space" related inventions refer to the primary transmitter as being a broadcast TV transmitter. An example is illustrated in FIG. 5: if TV transmitters are using one frequency for local television in one city (for example, M in FIG. 5), then it is not possible to use the same frequency for a different local television transmission in another moderately close city (for example, L), because receivers half-way between would receive two different transmissions on that same frequency. These would then interfere with each other. Accordingly, it is necessary to travel further away to a distant city (for example, B) before using that frequency for something else. As a result, it can be the case that frequencies reserved for television transmissions in one city are not actually used in the city itself. Accordingly it can then be re-used for white space transmissions, provided that the transmissions are at a low enough power that they do not interfere with television receivers in cities which use the frequency for broadcast television.

However, "white space" usage can be defined with a broader scope. It is conceivable that the primary could also be another telecommunication system. For example, nearby GSM base stations use different frequencies in the same way as the TV transmitters L and M (FIG. 5) (although this is not the case for 3G or 4G). Also, any telecommunication system has guard bands or frequency reuse factors >1, respectively.

The concept of access to different "spectrum layers" may include access to white space spectrum, but may also include access to spectrum owned by the network operator, free access to unlicensed spectrum etc. and which may be selected with different priorities according to user access right, QoS constraints etc.

The publications discussed above do not describe the use of route information, which describes time variant routes which may be taken periodically by users and their devices, and furthermore do not describe contextual application needs such as bandwidth and latency (i) Whilst location information is used (as referred to in the publications discussed above), no account is made of a user's route. This is important, as a user's route will allow a prediction to be made of their future communication (and hence network resource) needs, and as a result (a) the likely availability of network spectrum resources and (b) the match of user needs to available network spectrum resources. A prediction of (a) and (b) is useful, as this can determine which policies are used in the transmission of data (for example, an increased buffer size may be established) if it is known that the user will enter an area with poor network and/or spectrum resource availability for a specific user priority class.

(ii) Different applications have different bandwidth, latency and robustness needs. To maximize the Quality of Experience (QoE), it is important that the application needs are matched as closely as possible to the available spectrum resources and network resources, anticipating future requirements if possible by both predicting future application needs and location based routes which are taken by the user.

SUMMARY

In an embodiment, the invention provides a method for optimizing network spectrum utilization of a wireless communications network utilizing a radiofrequency spectrum. The method includes: determining, by a processor, spectrum resources at a location by determining the properties of the communication nodes and the utilization of bandwidth by all priority classes of user terminals in a defined area; predicting, by the processor, future geo-located contextual network needs for users terminals of a plurality of priority classes in the defined area, based on historical profiles; and optimizing, by the processor, the use of the radiofrequency spectrum based on the priority classes of the user terminals and the future geo-located contextual network needs of the user terminals in the defined area.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, a method and apparatus to optimize network spectrum utilization includes:
a) a communications network with multiple connections to user terminals whose spectrum, power, direction and other characteristics may be controlled;
b) one or more databases connected to the network;
c) at least two different classes of access priorities for radio frequency spectrum resources (e.g. spectrum owned by operator and spectrum shared among different operators);
d) at least two different priority classes of user and/or application priority; and
e) for each user their location, trajectory, current network usage and usage profile may be determined (User contextual information);
whereby:
the sensed spectrum at each user location of any priority class is continuously updated and stored in the network database together with the associated users contextual information, such that network spectrum resources may be optimized based on the existing and predicted future contextual needs of the lower priority users after the contextual needs of a higher priority users have been met.

The invention comprises a method to optimize network spectrum utilization comprising, a wireless communications network with multiple nodes, including base stations and user terminals, utilizing a radio frequency spectrum, at least two different classes of access priorities for radio frequency spectrum resources, at least two different priority classes of user terminal, which correspond to the access priorities. The priorities define the access priority to the radio frequency spectrum resources. The higher the priority is, the better is the access. Especially the "white spaces" in the network can play an important role, when the movement path of the user terminal is known. In a preferred embodiment the radio frequencies within the white space can be assigned to user terminals which travel within the white space are without interference.

The method comprises the following steps:
1. Determining the spectrum resources at a specific location by determining the properties of the communication nodes and the utilization of bandwidth by all priority classes of user terminals in a defined area. This step is in general necessary at the beginning as a configuration and setup step, or in regular time intervals. Whenever a new terminal enters this area only for this new terminal the parameters are necessary and the calculation is updated. By this approach the sensed spectrum at each user location of any priority class is continuously updated and stored in a network database together with the associated user terminal contextual information.
2. Predicting future geo-located contextual network needs for users terminals of all priority classes in the defined area, based on historical profiles. This can be done by a database, which stores user information over a longer time, wherein the identification of the user terminals is used to calculate a history profile of the user terminals. Furthermore, a tracking of the user device can be done by GPS or Base-Stations etc.
3. Optimization of the use of the radio frequency spectrum based on the priority classes and the future geo-located contextual network needs of the user terminals in the defined area. By ordering the devices according to their priority the access to the bands is done. Furthermore, it is possible to determine future needs in along the moving path of the user terminal to reserve bandwidth for future use.

The optimizing is, in an embodiment, based on the existing and predicted future geo-located contextual needs of the lower priority user terminals after the contextual needs of a higher priority user terminals have been met.

The priority of the user terminal is defined by the SIM and/or an application running and/or the network services used by the user terminal Depending on the subscriber contract of the owner of the user device high speed data can be limited or it is guaranteed that a defined minimum level of service is provided. So the more the subscriber pays the higher his priority can be. On the other side it also depends on the actual needs of the user terminal. If only voice communication is used, a very small bandwidth will be sufficient. In case a video is streamed the needs can be different. Depending on the protocol used or the services used in the network different priority can be assigned. So the priority can also be defined by network utilization, latency, maximum bandwidth of the user terminal and the applications running on it.

In case a new terminal enters an area the method further comprises:
    determining the specific location and properties of communication nodes in proximity to a new user terminal of known priority class, current location and predicted future path,
    determining the current and predicting the future spectrum needs of all other classes of users which are in this current location or which lie along the predicted future path,
    computing the location specific properties of the network spectrum resources at the current location and which lie along the projected route of the new user terminal,
    ranking, arbitrating and/or prioritizing the needs of the different user priority classes, including the new user terminal, against the available network spectrum resources and/or user terminal application context.

The method further comprises determining the spectrum resources at a specific location by determining the properties of communication nodes and the utilization of bandwidth by all priority classes of user terminals, iterating the process over multiple user terminals across a wide area such that a database indicating temporal spectrum resources (SR) is established;

predicting future geo-located contextual network needs for users terminals of all priority classes in the defined area, by using location aware nodes/user terminals, which are likely to travel along historically, mapped or peer defined routes, which allows to collect information at discrete location (X,Y) points of the application context, accordingly the application and its data needs are associated with a location, and is written to a Geo-Located Contextual Use (GLCU) database; a processing system accesses this database and computes a predicted set of application data needs for each user terminal along a predicted route, which are then stored in a Predicted Geo-Located Contextual Use (PGLCU) database, then a dynamic mapping between records of the PGLCU and SR databases according to the ranked priority classes of users represented in the PGLCU database is calculated, wherein the users who have the highest priority class are ranked most highly and allocated spectrum resources most suited to their contextual needs and those of a lower priority class are ranked less highly and allocated the remaining spectrum resources which may or may not be a good fit for their contextual needs.

The method further comprises a dynamic mapping between the PGLCU and SR databases and/or the ranking of users being updated when a new user enters the Defined Area. The mapping between the two PGLCU and SR databases is stored as a field in either the PGLU databases known as the User Ranking (UR) field.

Based on the foregoing, an estimated Quality of Experience (QoE) at a user terminal's future location is determined, which can be used to trigger mitigation measures and policies.

In another preferred embodiment to maximize the Quality of Experience, the application needs are matched as closely as possible to the available network spectrum resources, anticipating future needs if possible by both predicting future application needs and location-based routes which are taken by the user terminal, which is achieved by profiling user applications such that a prediction may be made of the likely future bandwidth and latency needs.

The method is implemented by base stations and other devices in the mobile network and also the user terminals are involved in the method. The process can be run on servers and databases within the network, which get information from the base stations or other network components. For example, the computer server/computer system can be conventional PC-Servers running operating systems like, Unix®, Linus®, Solaris®, Windows® etc. These servers have links to the base stations or other registers to get the information needed.

A further part of the invention provides a wireless communications network to optimize network spectrum utilization comprising, a wireless communications network with multiple nodes, including base stations and user terminals, utilizing a radio frequency spectrum, at least two different classes of access priorities for radio frequency spectrum resources, at least two different priority classes of user terminal, which correspond to the access priorities;

comprising a computer system configured
  to determine the spectrum resources at a specific location
    by determining the properties of the communication nodes and the utilization of bandwidth by all priority classes of user terminals in a defined area;
  to predict future geo-located contextual network needs for users terminals of all priority classes in the defined area, based on historical profiles;
  to optimize of the use of the radiofrequency spectrum based on the priority classes and the future geo-located contextual network needs of the user terminals in the defined area.

The proposed invention references different "spectrum layers" (e.g. access to "owned"/licensed spectrum (which could be spread to different frequency bands), white space usage as a secondary user, free access to unlicensed spectrum (e.g. ISM bands) etc.) which can be chosen with different priorities, QoS constraints and "cost" etc. Furthermore it may be embodied using different technologies, for example software-defined radio (SDR) and the transmission schemes used may be adapted to reflect the different characteristics and requirements of the available spectrum.

Additionally, embodiments of the invention may be adapted so as to be consistent with new initiatives such as Authorized Shared Access (ASA) and Licensed Shared Access (LSA). Under a scheme such as ASA, a dynamic system may be created by the administrator/regulator to be shared by different authorized parties, whereby a database is continuously updated with available free space as it become available. This "ASA spectrum" may then be allocated on a dynamic basis. It is considered that this "ASA spectrum" and additionally available licensed spectrums are analogous to having two or more different "spectrum layers," and as such are consistent with the invention described here.

The advantages of the invention include the following:
(a) determining the location and properties of communication nodes in proximity to a new users of known priority class current location and predicted future path. Advantage: characterize the capacity of communication nodes which may be needed by the new user.
(b) determining the current and likely future spectrum needs of high and low priority classes of users which are in this current location or which lie along the predicted future path. Advantage: see (d) below.
(c) computing the location specific properties of the network spectrum resources at the current location and which lie along the projected route of the new user. Advantage: see (d) below.
(d) ranking, arbitrating and prioritizing the needs of different user priority classes, including the new user, against the available network spectrum resources and user application context. Advantage: rank and prioritize the new user against other user users for the available network resources, and implement a mitigation policy if the QoS (Quality of service) for the new user falls below a preset level.

A user's route will allow a prediction to be made of their future communication (and hence network resource) needs, and as a result (a) the likely availability of network spectrum resources and (b) the match of user needs to available network spectrum resources. A prediction of (a) and (b) is useful, as this can determine which policies are used in the transmission of data (for example, an increased buffer size may be established) if it is known that the user will enter an area with poor and network spectrum resource availability for a specific user priority class.

Determining a user's current location, route and associated use of white space resources includes the following:
(i) Location and routing: Increasingly mobile terminals include hardware for determining a user's location. From this a user's route may be established. Comparing a current route with a user's historical route or the route of other users are among the methods which may be used to determine a user's likely future path. Base stations and other communication devices may then be mapped along the path, such that it is possible to determine the properties of each communications device the user will come within range of along their chosen path. Each communications device will have a set of properties which can include utilization, latency, maximum bandwidth, etc. These may be considered in the context of the predicted needs of a high priority class user to determine what, if any, spectrum is likely to remain for a lower priority class user through the use of a database. Once computed, network spectrum resource information may be made available to lower priority class users in real-time and allocated according to the predicted future paths of travel for both lower priority and higher priority user classes.

(ii) Application context: Different applications have different bandwidth, latency and robustness needs. To maximize the Quality of Experience, it is important that the application needs are matched as closely as possible to the available network spectrum resources, anticipating future needs if possible by both predicting future application needs and location-based routes which are taken by the user. This may be achieved by profiling user applications such that a prediction may be made of the likely future bandwidth and latency needs. This information, together with location and routing information (see (i) above) may then be used to determine which network resources along the route provide the best match for the users communications needs.

Thus aspects of the invention include: (a) determining the location and properties of communication nodes in proximity to a new user of known priority class, current location and predicted future path, (b) determining the current and likely future spectrum needs of all other (high and low priority) classes of users which are in this current location or which lie along the predicted future path, (c) computing the location specific properties of the network spectrum resources at the current location and which lie along the projected route of the new user, (d) ranking, arbitrating and prioritizing the needs of the different user priority classes, including the new user, against the available network spectrum resources and user application context.

It should be noted that the invention has a large number of possible embodiments. The text below represents one exemplary embodiment. Details which would be appreciated by one skilled in the art, such as the way by which a user communicates with a network resource, or the algorithms used to prioritize the needs of users which are in a higher priority class (such that the output of the process might feed into the network resource allocation decision-making) are not explicitly addressed herein.

Figure 2:
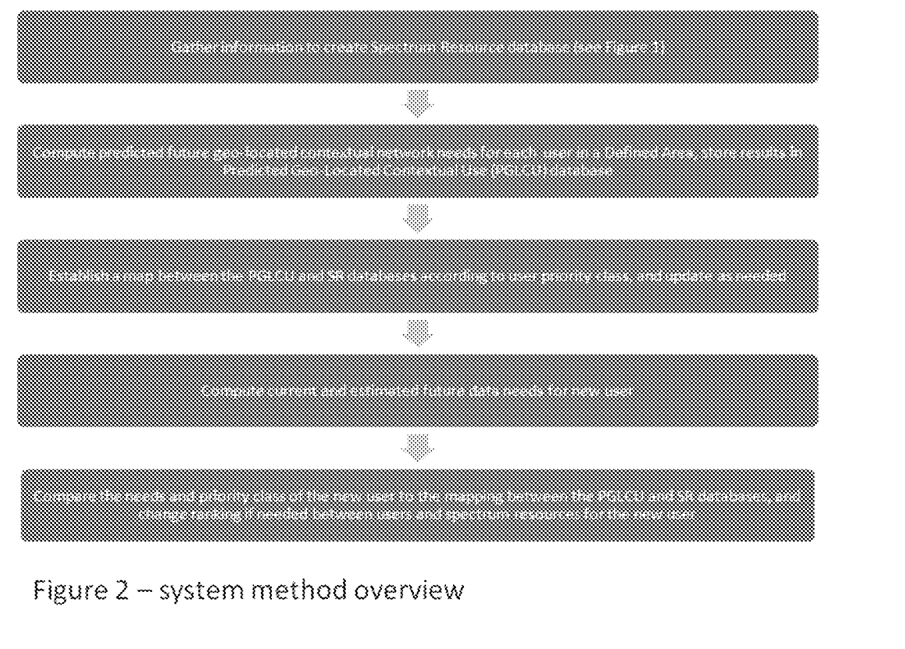
FIG. 2 depicts a flowchart corresponding to utilizing the spectrum sensing method for performing mapping between a Predicted Geo-Located Contextual Use (PGLCU) database and a Spectrum Resource (database) in an embodiment.
Figure 3:
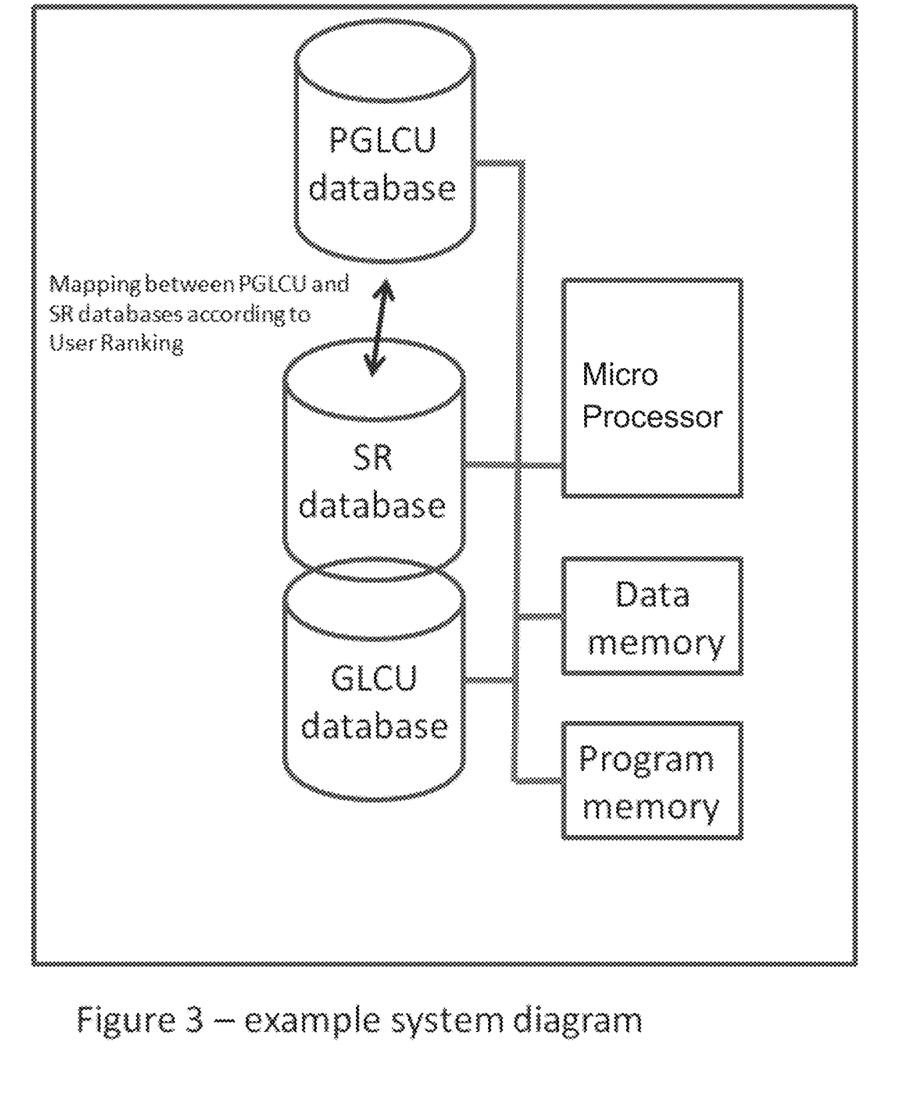
FIG. 3 depicts a diagram of the system in an embodiment.

The system may be divided into a number of functions contained within a method, with an overview being shown in FIG. 2. A corresponding system diagram is illustrated in FIG. 3. With reference to the following description, the "Defined Area" is an area in proximity to a current location and predicted route of the user.

Figure 1:
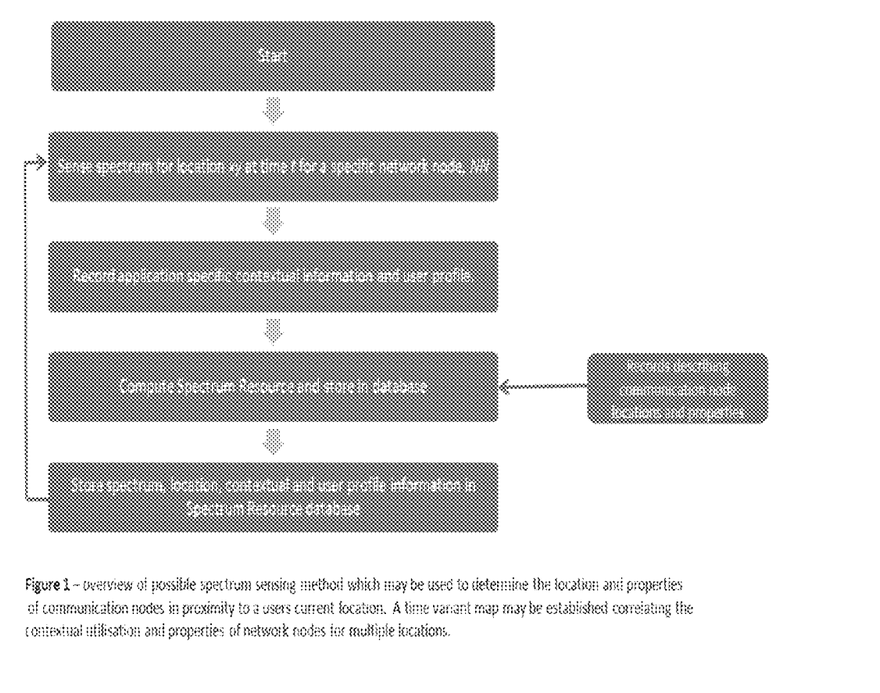
FIG. 1 depicts an flowchart corresponding to a spectrum sensing method in an embodiment.

The first step determines the spectrum resources at a specific location by determining the properties of communication nodes and the utilization of bandwidth by all priority classes of users. One exemplary approach is illustrated in FIG. 1. Here, spectrum which is available from an identified communications node is sensed at a known position and time. This process is iterated over multiple users across a wide area such that a database indicating temporal spectrum resources (SR) is established. The manner in which this SR database is generated will be appreciated by those skilled in the art.

Accordingly, this part of the process takes as input the sensed spectrum at a location and generates a network spectrum resources (SR) database therefrom.

The second step computes the predicted future geo-located contextual network needs for users of all priority classes in the Defined Area. This may be achieved using location-aware devices, which are likely to travel along historically, mapped or peer-defined routes. At repeated discrete location (X,Y) points, an application context is known. Accordingly, an application and its data needs may be associated with a location, and also with a user status. This information is written to the Geo-Located Contextual Use (GLCU) database together with the profile of each user. A processing system accesses this database to compute a predicted set of application data needs for each user along a predicted route (this route is based on mapped, peer defined or historical data, for example). These predicted needs are then stored in a Predicted Geo-Located Contextual Use (PGLCU) database.

Accordingly, this part of the process takes as input application data needs at specific locations for users in a Defined Area, and generates a PGLCU database therefrom, which contain records of the predicted future location specific application use and data needs for each user in the Defined Area.

The third step builds a dynamic mapping between records of the PGLCU and SR databases according to the ranked priority classes of users represented in the PGLCU database. The users who have the highest priority class are ranked most highly and allocated spectrum resources most suited to their contextual needs. Those of a lower priority class are ranked less highly and allocated the remaining spectrum resources which may or may not be a good fit for their contextual needs. The mapping between the PGLCU and SR databases is dynamic, and the rankings of users are updated when a new user enters the Defined Area. The mapping between the PGLCU and SR databases may be stored as a field in the PGLU databases known as the User Ranking (UR) field.

Accordingly, this part of the process takes as input records from the SR and PGLCU databases and generates a mapping between the SR and PGLCU databases based on ranking users, which is defined by the priority class of the user. User Ranking is stored as a field in the PGLU database.

The fourth step computes the current and estimated future data needs (latency, bandwidth etc.) for a new user in the Defined Area, placing the result in a store called User Geo-Located Future Data Needs (UGLFDN) together with the priority class of the user.

Accordingly, this part of the process takes as input Defined Area characteristics for a new user (Applications running, user profile, route information, user priority class), and based thereon stores the estimated future data needs of the new user along projected route.

The fifth step compares the new user priority class to the priority classes of users in the PGLCU database and dynamically ranks the user according to other users. The resulting ranking is then used to update the mapping between the SR and PGLCU databases, and is written to the User Ranking field of the PGLU database. A further expansion of the fifth step includes the introduction of a computation that determines an estimated Quality of Experience at a user's future location. This is then used to trigger mitigation measures and policies. For example, if the QoE falls below a defined threshold, then mitigation measures are implemented. These can, for example, include temporarily increasing the data transfer rate and buffer size to ensure low disruptions to the QoE in an area of reduced SR availability for a particular user. The mitigation measures are determined by policies which are selected according the application context/location/route of the users in the Defined Area. The policies themselves are defined by the network operator.

Accordingly, this part of the process takes as input User Ranking between the SR and PGLCU databases, user future data need at specific locations, and mitigation policies, and generates based thereon updated User Ranking, user Quality of Experience along predicted route, and mitigation policy selection.

Figure 4:
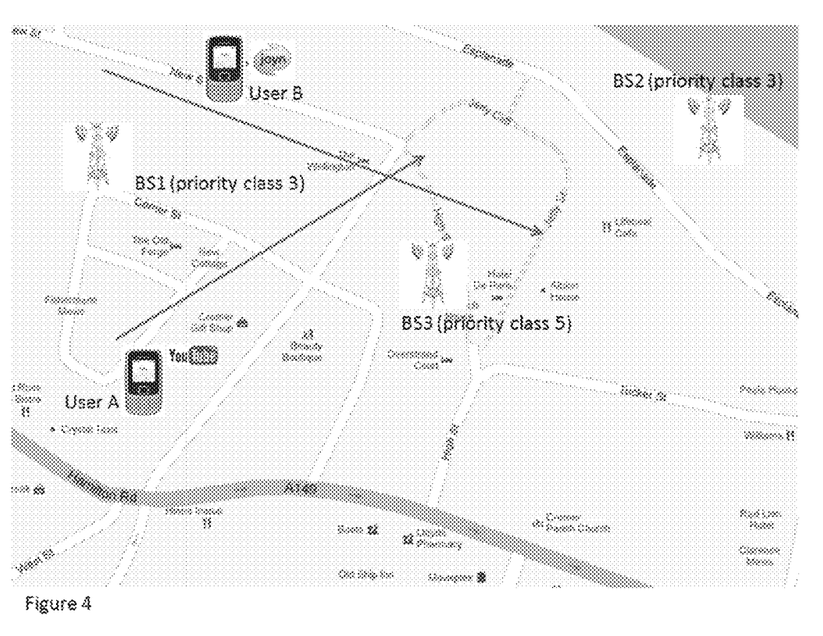
FIG. 4 shows an exemplary white space situation.

FIG. 4 provides an examples of use cases:

(1) Priority class 3 user passes between two priority class 3 base stations whilst running an application with high latency, high bandwidth data needs:

User A who has a priority class of 3 is following a route which takes them between two priority class 3 base stations BS1 and BS2, at which point the only communication means is a base station for users of priority class 5. User A is running a YouTube video streaming application. Spectrum sensing/network databases reveals that the base station for users of priority class 5 (BS3-class 5) is at full capacity. In this instance, step 1 of the invention reveals that the base station for priority class 5 users currently has no spare capacity. Steps 2 and 3 reveal the contextual needs of other users in the area which are along the path of User A and compute and store how these relate to the available spectrum resources, and provide a mechanism for ranking users to available spectrum resources according to their priority class. Step 4 computes the estimated future location dependent data needs for User A. Step 5 updates the ranking of users along User A's route, and determines that there is no spare capacity for User A (due to their low ranking vis-à-vis other users.) As the QoE for User A then falls below a predefined level one of a number of present network defined policies are implemented. With reference to the contextual application needs, the policy in this instance may increase the buffer size and data rate whilst User A is still within range of a base station for which they have a higher priority access rating, reducing the risk of a service interruption when they are passing between BS1 and BS2 and only in range of BS3-class 5.

(2) Priority class 3 user passes out of range of a priority class 3 Base station whilst running an application with low latency data transfer needs:

User B is following a route which takes them out of range of the two priority class 3 base stations, BS1 and BS2 but into the range of priority class 5 base station BS3-class 5. User B is running a high quality voice & video communication session, which demands both high data rates and low latency. In this instance, step 1 of the invention reveals that BS3-class 5 is at partial capacity. Steps 2 and 3 reveal the contextual needs of other users in the area which are along the path of User B and compute and store how these relate to the available spectrum resources, and provide a mechanism for ranking users to available spectrum resources according to their priority class. Step 4 computes the estimated future location dependent data needs for User B. Steps 2 and 3 reveal that SU2 will pass through the coverage area of PU BS, and that a connection is required owing to the properties of the data connection (high bandwidth, low latency). Step 5 updates the ranking of users along User B's route, and determines that there is spare capacity for User B and that this should remain for the duration that User B is within its range and needs its connection. Accordingly a connection is prioritised and scheduled between User B and BS3-class 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for optimizing network spectrum utilization for a wireless communications network utilizing radiofrequency spectrum resources, at least two different classes of access priorities for the radiofrequency spectrum resources, and at least two different priority classes of user terminals, wherein the wireless communication network includes multiple communication nodes, including base stations and user terminals, the method comprising:

determining, by a processor, available radiofrequency spectrum resources at a specific user terminal location by determining the properties of the communication nodes and the utilization of the radiofrequency spectrum resources by all priority classes of user terminals in a defined area proximate to the user terminal location or a projected route of the user terminal;

predicting, by the processor, future geo-located contextual network needs for user terminals of all priority classes in the defined area, based on historical profiles, wherein the future geo-located contextual network needs are contextual application needs; and optimizing, by the processor, the use of the radiofrequency spectrum resources based on the priority classes of the user terminals and the future geo-located contextual network needs of the user terminals in the defined area;

wherein the determined available frequency spectrum resources at each user terminal location of any priority class is continuously updated and stored in a network database together with associated user terminal geo-located contextual network needs;

wherein the optimizing includes prioritizing geo-located contextual network needs of higher priority user terminals over geo-located contextual network needs of lower priority user terminals; and wherein the method further comprises:

determining an estimated Quality of Experience corresponding to the user terminal's future location, and in response to determining that the estimated Quality of Experience falls below a threshold, increasing a data transfer rate for the user terminal.

2. The method according to claim 1, wherein the priority of a user terminal is based on a Subscriber Identity Module (SIM) of the user terminal, an application running on the user terminal, and/or network services used by the user terminal.

3. The method according to claim 1, wherein the priority of a user terminal is based on network utilization, latency, and/or maximum radiofrequency spectrum resources of the user terminal.

4. The method according to claim 1, further comprising:

determining specific user terminal location and properties of communication nodes of the wireless communications network in proximity to a new user terminal of a known priority class, current user terminal location and predicted future path;

determining current spectrum needs and predicting future spectrum needs of all other classes of user terminals in the current user terminal location of the new user terminal and/or which lie along the predicted future path of the new user terminal;

computing user terminal location-specific properties of spectrum resources at the current user terminal location and along the predicted future path of the new user terminal; and ranking, arbitrating and/or prioritizing the needs of the new user terminal and different classes of user terminals based on available network radiofrequency spectrum resources and/or user terminal application context.

5. The method according to claim 1, further comprising:

determining radiofrequency spectrum resources at a specific user terminal location by determining the properties of communication nodes of the wireless communication network and utilization of radiofrequency spectrum resourcesbandwidth by all priority classes of user terminals and iterating over multiple user terminals across a wide area such that a database indicating temporal radiofrequency spectrum resources (SR) is established;

predicting future geo-located contextual network needs for users terminals of all priority classes in the defined area, by using location aware nodes/user terminals, which are likely to travel along historically, mapped or peer-defined routes;

collecting and storing contextual application need information at a Geo-Located Contextual Use (GLCU) database;

accessing the GLCU database and computing a predicted set of application data needs for each user terminal along a predicted route, and storing the predicted set of application data needs in a Predicted Geo-Located Contextual Use (PGLCU) database;

calculating a dynamic mapping between records of the PGLCU and SR databases according to ranked priority classes of users represented in the PGLCU database, wherein users having the highest priority class are ranked most highly and allocated radiofrequency spectrum resources suited to their geo-located contextual network needs, and wherein users of a lower priority class are ranked less highly and allocated remaining radiofrequency spectrum resources.

6. The method according to claim 5, wherein the mapping between the PGLCU and SR databases is dynamic and the rankings of users are updated when a new user enters the Defined Area.

7. The method according to claim 1, wherein the optimizing takes into account use of white space resources.

8. The method according to claim 1, wherein to maximize the Quality of Experience, application needs are matched to available network radiofrequency spectrum resources, and future needs are anticipated by predicting future application needs and location-based routes for user terminals based on profiling user applications.

9. A wireless communications network utilizing a radiofrequency spectrum and configured to optimize network spectrum utilization, the wireless communication network comprising:

multiple communication nodes, including base stations and user terminals, utilizing the radiofrequency spectrum, wherein the radiofrequency spectrum has at least two different classes of access priorities for radiofrequency spectrum resources, and wherein the user terminals comprise user terminals of at least two different priority classes corresponding to the access priorities; and a computer system configured to:

determine available radiofrequency spectrum resources at a specific user terminal location by determining the properties of the nodes and the utilization of the radiofrequency spectrum resources by all priority classes of user terminals in a defined area proximate to the user terminal location or a projected route of the user terminal;

predict future geo-located contextual network needs for the user terminals of all priority classes in the defined area, based on historical profiles, wherein the future geo-located contextual network needs are contextual application needs;

optimize use of the radiofrequency spectrum resources based on the priority classes and the future geo-located contextual network needs of the user terminals in the defined area;

wherein the determined available frequency spectrum resources at each user terminal location of any priority class is continuously updated and stored in a network database together with associated user terminal geo-located contextual network needs;

wherein the optimizing includes prioritizing geo-located contextual network needs of higher priority user terminals over geo-located contextual network needs of lower priority user terminals; and wherein the computer system is further configured to:

determine an estimated Quality of Experience corresponding to the user terminal's future location, and in response to determining that the estimated Quality of Experience falls below a threshold, increase a data transfer rate for the user terminal.

10. The wireless communications network according to claim 9, wherein priority of a user terminal is defined by a Subscriber Identity Module (SIM) of the user terminal, an application running on the user terminal, and/or network services used by the user terminal.

11. The wireless communications network according to claim 9, wherein priority of a user terminal is defined by network utilization, latency, and/or maximum radiofrequency spectrum resources of the user terminal.

12. The wireless communications network according to claim 9, wherein the computer system is further configured to:
  determine specific user terminal location and properties of nodes in proximity to a new user terminal of known priority class, current user terminal location and predicted future path;
  determine current spectrum needs and predicting future spectrum needs of all other classes of user terminals in the current user terminal location of the new user terminal or which lie along the predicted future path of the new user terminal;
  compute user terminal location-specific properties of network spectrum resources at the current user terminal location of the new user terminal and along the predicted future path of the new user terminal; and
  rank, arbitrate and/or prioritize the needs of the new user terminal and different classes of user terminals based on available network radiofrequency spectrum resources and/or user terminal application context.

13. The wireless communications network according to claim 9, wherein the computer system is further configured to:
  determine radiofrequency spectrum resources at a specific user terminal location by determining the properties of communication nodes of the wireless communication network and utilization of radiofrequency spectrum resources by all priority classes of user terminals and iterating over multiple user terminals across a wide area such that a database indicating temporal radiofrequency spectrum resources (SR) is established;
  predict future geo-located contextual network needs for users terminals of all priority classes in the defined area, by using location aware nodes/user terminals, which are likely to travel along historically, mapped or peer-defined routes;
  collect and store contextual application need information at a Geo-Located Contextual Use (GLCU) database;
  access the GLCU database and computing a predicted set of application data needs for each user terminal along a predicted route, and storing the predicted set of application data needs in a Predicted Geo-Located Contextual Use (PGLCU) database;
  calculate a dynamic mapping between records of the PGLCU and SR databases according to ranked priority classes of users represented in the PGLCU database, wherein users having the highest priority class are ranked most highly and allocated radiofrequency spectrum resources suited to their geo-located contextual network needs, and wherein users of a lower priority class are ranked less highly and allocated remaining radiofrequency spectrum resources.

14. The wireless communications network according to claim 13, wherein the mapping between the PGLCU and SR databases is dynamic and the ranking of users is updated when a new user enters the Defined Area.

15. The wireless communications network according to claim 9, wherein optimizing the use of the radiofrequency spectrum takes into account use of white space resources.

16. The wireless communications network according to claim 9, wherein to maximize the Quality of Experience, application needs are matched to available network radiofrequency spectrum resources, and future needs are anticipated by predicting future application needs and location-based routes for user terminals based on profiling user applications.

* * * * *